United States Patent
Beckius et al.

[11] 3,991,888
[45] Nov. 16, 1976

[54] PAN UNSTACKER

[75] Inventors: Herbert Jean-Pierre Beckius, York; Richard Bernard Goodhart, New Freedom, both of Pa.

[73] Assignee: Alto Corporation, York, Pa.

[22] Filed: Sept. 10, 1975

[21] Appl. No.: 611,865

[52] U.S. Cl. ................. 214/8.5 A; 214/8.5 D; 221/212; 221/242
[51] Int. Cl.² .................................. B65G 59/04
[58] Field of Search ............ 214/6 DS, 6 FS, 8.5 D, 214/8.5 A; 271/18.1, 193; 221/212, 241, 242

[56] References Cited
UNITED STATES PATENTS

| | | | |
|---|---|---|---|
| 2,766,043 | 10/1956 | Buccicone | 271/18 |
| 3,058,614 | 10/1962 | Marasso | 221/9 |
| 3,101,851 | 8/1963 | Heide et al. | 214/8.5 R X |
| 3,924,759 | 12/1975 | Madonia | 214/8.5 D |
| 3,933,254 | 1/1976 | Pulver et al. | 214/6 DS |
| 3,937,335 | 2/1976 | Lanham et al. | 214/6 DS |

*Primary Examiner*—Robert B. Reeves
*Assistant Examiner*—Francis J. Bartuska
*Attorney, Agent, or Firm*—Thomas Hooker

[57] ABSTRACT

A pan unstacker includes an elevator for lifting a stack of pans as it is depleted to position the top pan in a pick up position and a magnetic lift for engaging the lips of the top pan and raising the pan to a magnetic discharge conveyor. The unstacker is manually adjustable to accommodate different size pans through the use of threaded adjustment shafts and elevator and lift drives connecting fixed drive motors on the unstacker frame to moveable elevators and lift heads.

24 Claims, 16 Drawing Figures

PAN UNSTACKER

The invention relates to unstackers for moving individual top pans or sheets from a stack of pans or sheets and depositing the pan or sheet on a conveyor leading away from the unstacker for use in a subsequent operation. More specifically, the disclosed pan unstacker is intended for use in unstacking bakery product pans and delivering individual pans to a bakery line where the pans are filled with bakery dough and passed through an oven where the dough is baked. Following removal of the baked product, the pans are stacked and returned to the unstacker for subsequent unstacking and reuse. Pan unstackers of this type are disclosed in Marasso U.S. Pat. No. 3,058,614 and Temple U.S. Pat. No. 3,517,835.

In the bakery industry baking pans are individually supplied on the baking line where bakery dough is either manually or automatically deposited on the glazed surface of the pans following which the pans are placed in an oven for baking. Different types of bakery products use different size pans. Bakery lines operate rapidly and require that the pans be delivered to the lines at regular intervals and at a constant rate. The pans are conventionally delivered from a stack of pans.

The pan unstacker of the present invention represents an improvement over conventional unstackers used for delivering pans to bakery lines. Pans are delivered to the bakery line at a uniform rate despite change over from one stack to a subsequent stack without injury to the glaze on the dough-receiving surface of the pan. The present unstacker is more reliable than conventional unstackers in that pans are not dropped during unstacking and warped or misoriented pans in the stack are reliably delivered from the stack to the bakery line. Noise is reduced.

The unstacker is easily adjustable to accommodate different size pans required to bake different types of bakery products. Adjustments are easily made by an operator in the bakery so that the stack elevator, the magnetic lift heads, and the stack guides are all properly positioned to receive stacks of pans of a given width. A second manual adjustment locates stop posts in a proper position so that the stacks of pans moved into the position for engagement with the elevator are centered over the elevator lift wings to prevent tilting during lifting of the stack and during unstacking of the individual top pans in the stack. The unstacker includes individual fixed drive motors for the stack elevator and the unstacking unit and drives permitting adjustment of the elevator and lift heads while maintaining engagement with the drive motors. This feature is particularly valuable in bakeries where a number of different products are made on a single bakery line and each product is baked in a different size pan. The unstacker is easily and rapidly adjusted to handle different size pans, reducing change over time to a minimum.

Other objects and features of the invention will become apparent as the description proceeds, especially when taken in conjunction with the accompanying drawings illustrating the invention, of which there are nine sheets.

Figures 1, 15, 16:
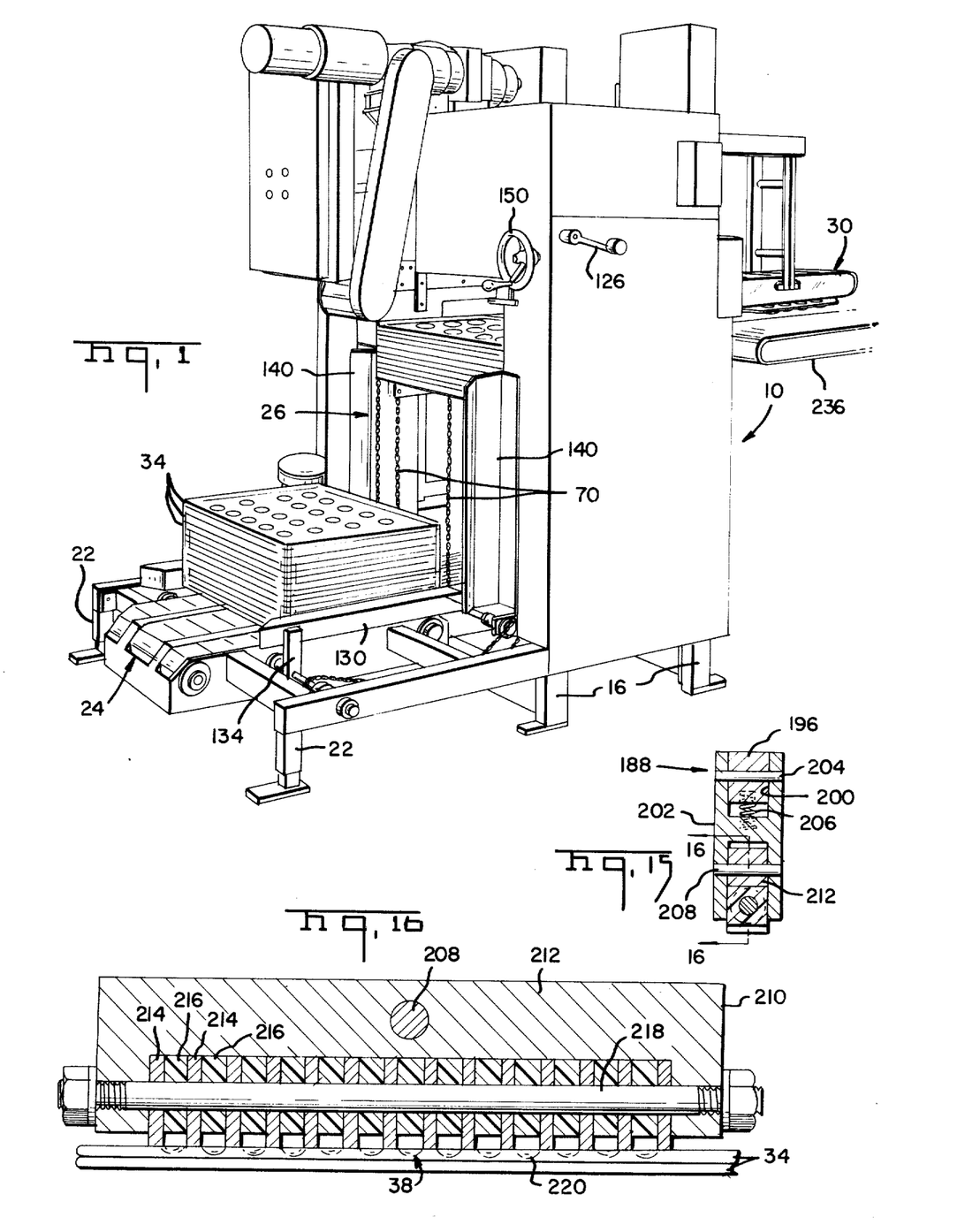
FIG. 1 is a perspective view of a pan unstacker according to the invention.
FIG. 15 is a sectional view taken along line 15—15 of FIG. 8.
FIG. 16 is a sectional view taken along line 16—16 of FIG. 15.

Magnetic bun pan unstacker 10 includes a frame 12 having a base 14, upstanding right and left posts 16 and 18 and a top 20. The base and top are formed from a number of rails secured to each other and to posts 16 and 18 to form a rigid structure. As illustrated in FIG. 1, the frame is supported by legs on posts 16 and 18 and at the front of the base.

Figure 14:
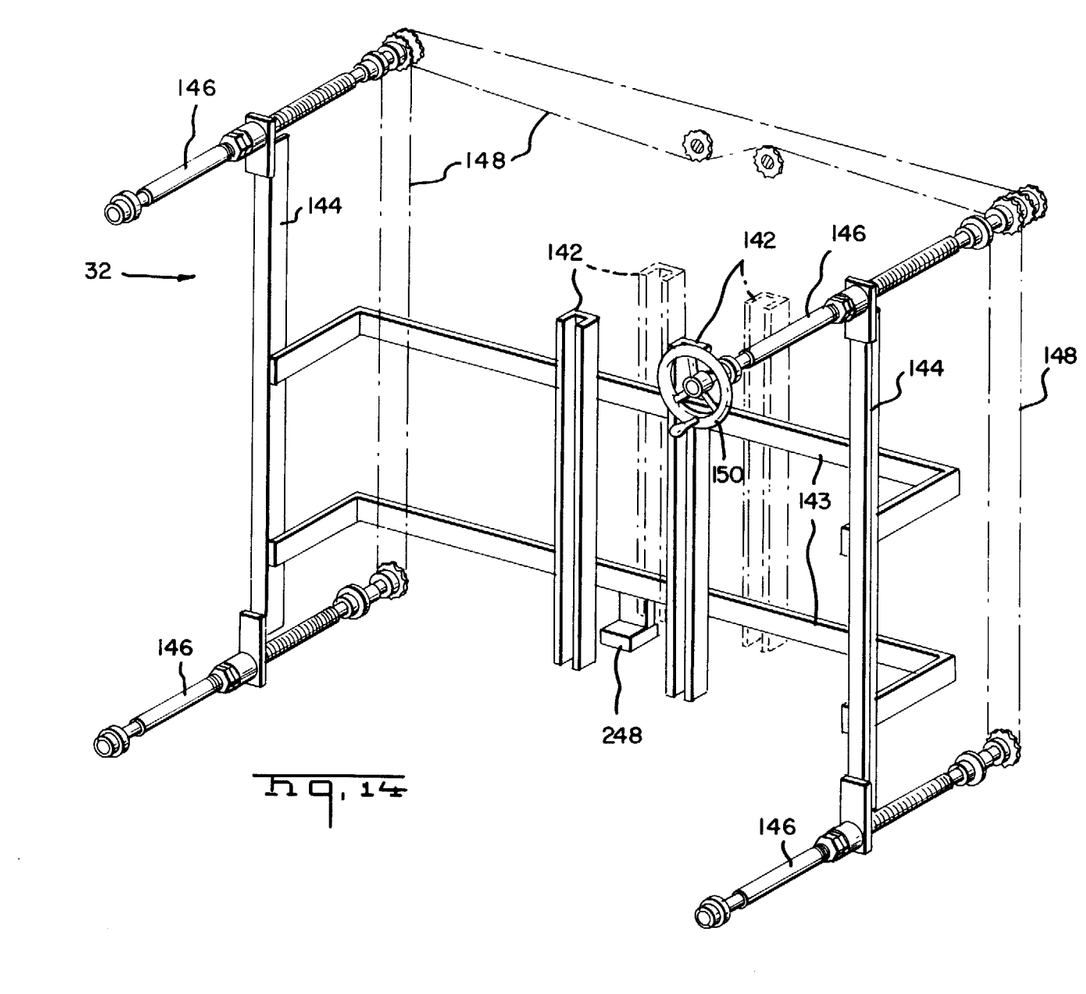
FIG. 14 is a perspective view of the adjustable stop assembly.

The frame supports an infeed conveyor assembly 24, an adjustable guide, elevator and lift assembly 26, a magnetic discharge conveyor 30, and an adjustable stop assembly 32 illustrated in FIG. 14, together with suitable drives and controls for actuating the unstacker.

Stacks of rectangular bakery pans 34 are placed on the infeed conveyor assembly 24 and moved into the unstacker between the guides of assembly 26 to a lift position 36 between elevators of assembly 26 where the stack is lifted by the elevators to move the top pan in the stack to a pick up position 38 beneath the discharge conveyor 30. The magnetic pan lifts then lower to engage the top pan and rise past the discharge conveyor so that the pan is lifted from the stack and stripped from lifts onto the conveyor. The pan is carried away from the unstacker by the conveyor and discharged to another conveyor or pan receiver, as required. The guide, elevator and lift assemblies are manually adjustable laterally to accommodate stacks of pans having different widths. The stop assembly limits insertion of the stack into the machine and is also manually adjustable to accommodate stacks of pans having different lengths. In this way, the operator can easily and quickly adjust the unstacker to handle different sized pans which are required for different bakery products.

The structure of the unstacker 10 will now be described in further detail.

Figure 11:
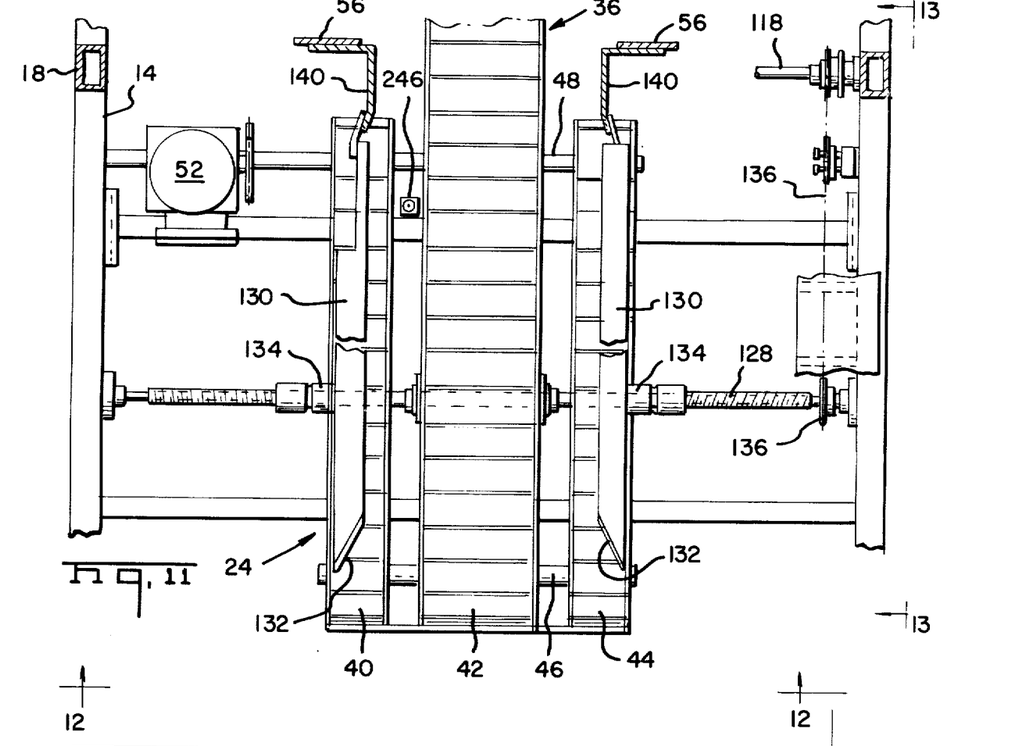
FIG. 11 is a top view of the infeed conveyor taken along line 11—11 of FIG. 4.
Figure 12:
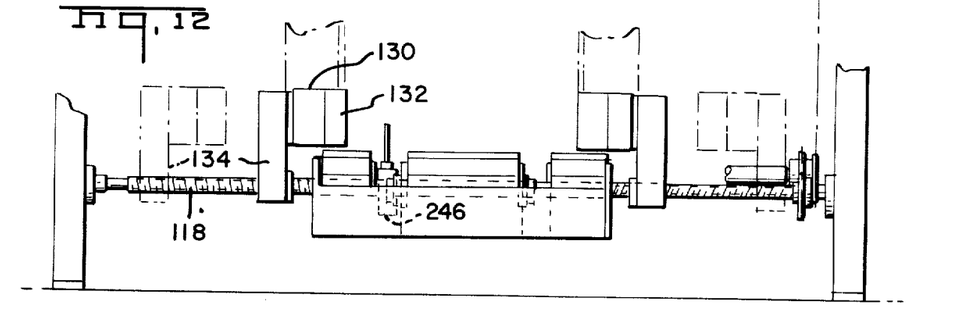
FIGS. 12 and 13 are front and side elevational views taken along lines 12—12 and 13—13, respectively, of FIG. 11.
Figure 13:
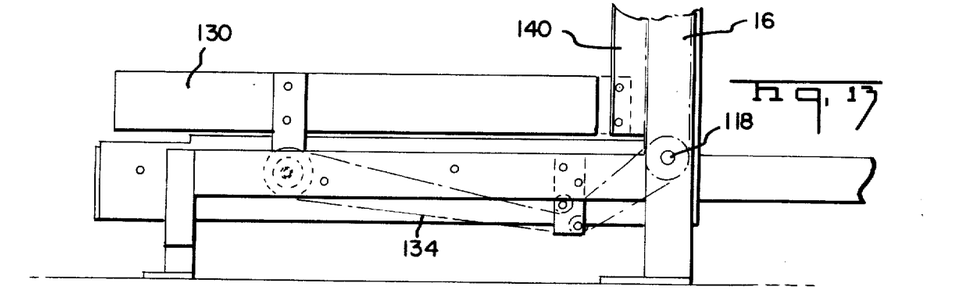

As illustrated in FIG. 11, the infeed conveyor assembly 24 includes three flat-link conveyor belts 40, 42, and 44 extending from the front of the unstacker toward the lift position 36. The center belt 42 extends beyond belts 40 and 44 into the lift position 36 between the elevators of assembly 26. Belts 40 and 44 extend around rollers carried on shafts 46 and 48 which are journaled in bearings on frame base 14. The longer conveyor belt 42 extends around a roller on shaft 46 and a roller on shaft 50 (See FIG. 2) located beyond the lift position 36y. The upper runs of the three belts slide along suitable support surfaces on base 14.

Drive motor 52 on base 14 rotates shafts 48 and 50 through suitable chain drives to move the upper runs of the conveyors from the front of unstacker 10 toward position 36. During operation of the unstacker, the infeed conveyors are started and stopped in response to the condition of sensors on the unstacker as will be described subsequently in greater detail.

Figure 3:
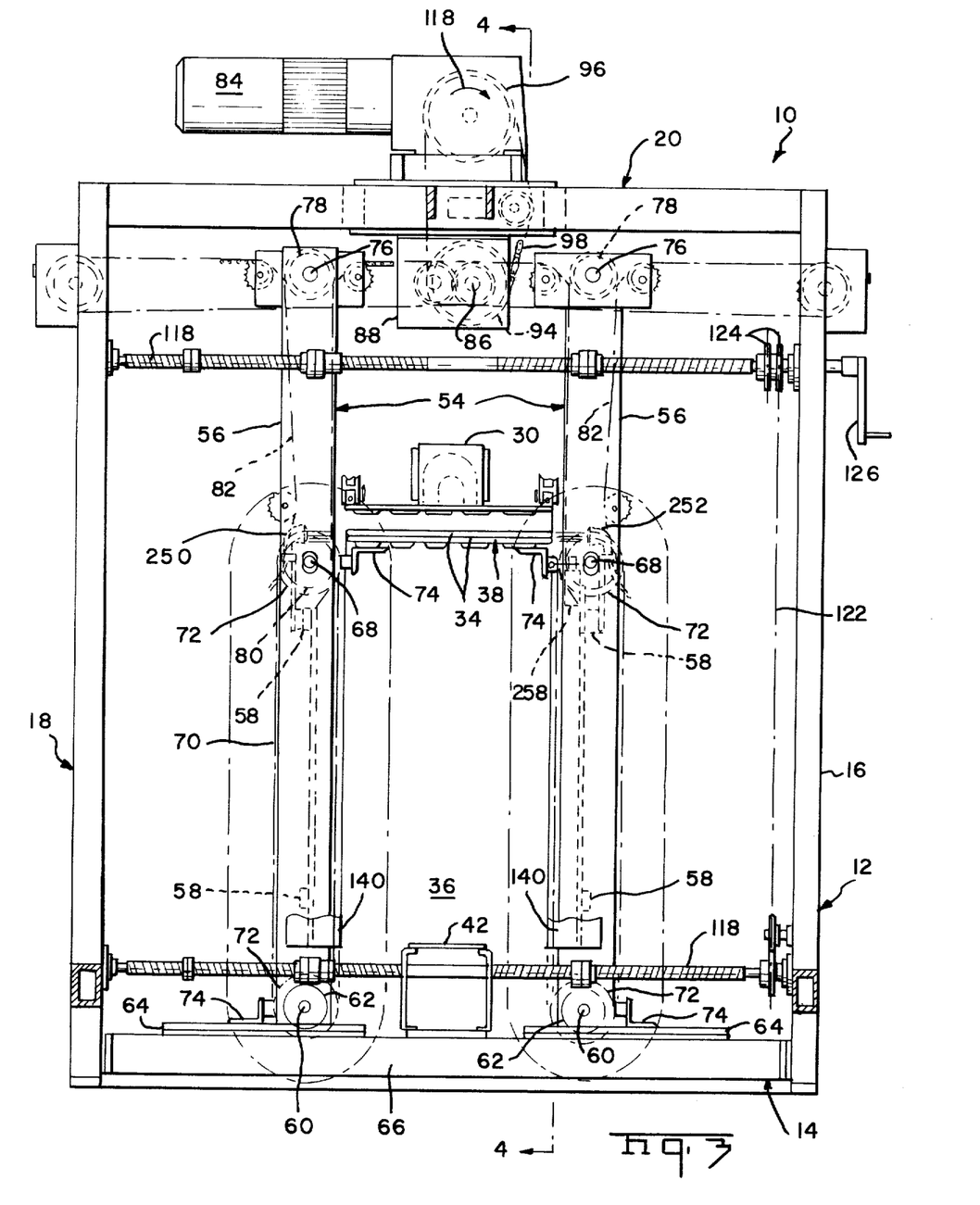
FIG. 3 is a sectional view taken along line 3—3 of FIG. 2.

The adjustable elevator and guide assembly 26 includes a pair of like frames 54 located to either side of the lift position 36 and extending upwardly past the discharge conveyor 30. Each frame 54 includes a pair of spaced support plates 56 secured together by rungs 58. Shafts 60 are journaled in bearings mounted on the lower ends of plates 56 with support wheels 62 rotatably mounted on the free ends of the shafts. The wheels rest on upstanding angles 64 secured to the tops of transverse cross members 66 as illustrated in FIG. 3 to support the frames while permitting movement thereof toward and away from the lift position. Each frame includes a second shaft 68 located above shaft 60 and slightly below discharge conveyor 30. Shaft 68 is journaled in bearings on the plates. The two shafts 60 and 68 are linked together by a pair of spaced chains 700 which extend around sprocket gears 72 carried by the shafts. A pair of spaced lift flights 74 is secured to the chains 70 of each frame and with rotation of the shafts move along a closed path having an upward run extending from the infeed conveyor past the lift position and toward the discharge conveyor. Each frame 54 carries a third shaft 76 journaled in bearings at the upper ends of plates 56. Shafts 76 carry sprockets 78 which are connected to sprockets 80 on shafts 68 through drive chains 82.

An elevator drive motor 84 is mounted on the top of the unstacker 10 and is connected to primary drive shaft 86 journaled in bearings on plates 88 extending below top 20. A secondary drive shaft 90 is also carried in bearings on plates 88. Gears 92 carried by shafts 86 and 90 are meshed so that the primary and secondary shafts rotate together, although in opposite directions. Primary drive shaft 86 carries sprocket gear 94 which is linked to the output sprocket 96 of the drive motor 84 by chain 98.

Figure 6:
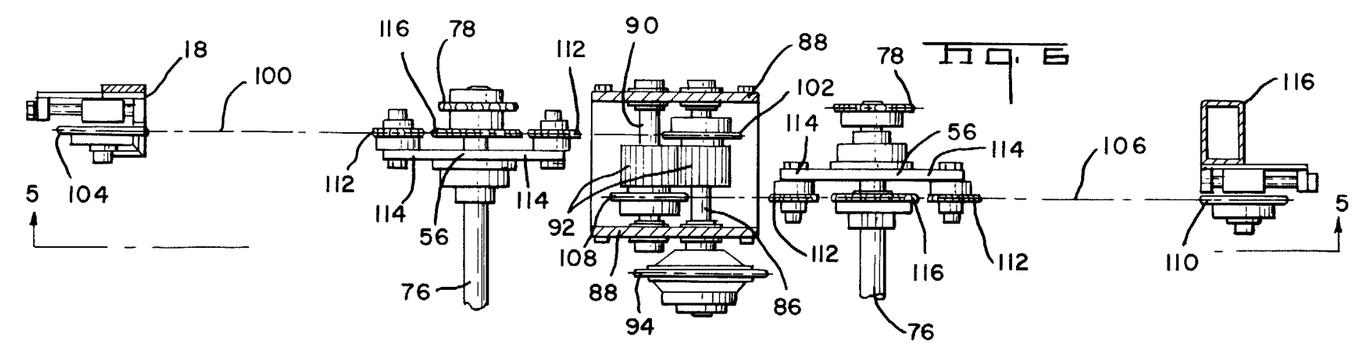
FIG. 6 is an elevational view taken along line 6—6 of FIG. 5.

Chain 100 extends around sprocket gear 102 on main drive shaft 86 and gear 104 rotatably mounted on a post 18. Chain 106 extends between sprocket gear 108 on secondary drive shaft 90 and sprocket gear 110 carried by post 16 opposite the post 18 carrying gear 104. See FIG. 6. The upper run of each chain 100 and 106 passes over idler gear 112 rotatably mounted on lateral extensions 114 at the upper ends of support plates 56 and under drive sprocket gears 116 mounted on shafts 76. Motor 84 rotates output sprocket gear 96 in the direction of arrow 118 shown in FIG. 3 so that the shaft 76 of the right hand frame is rotated in a clockwise direction as shown in FIG. 3 and the shaft 76 of the left hand frame is rotated in a counter-clockwise direction as shown in the same Figure and the lift flights 74 of each frame are moved upwardly along the run extending from the infeed conveyor to the discharge conveyor.

Figure 2:
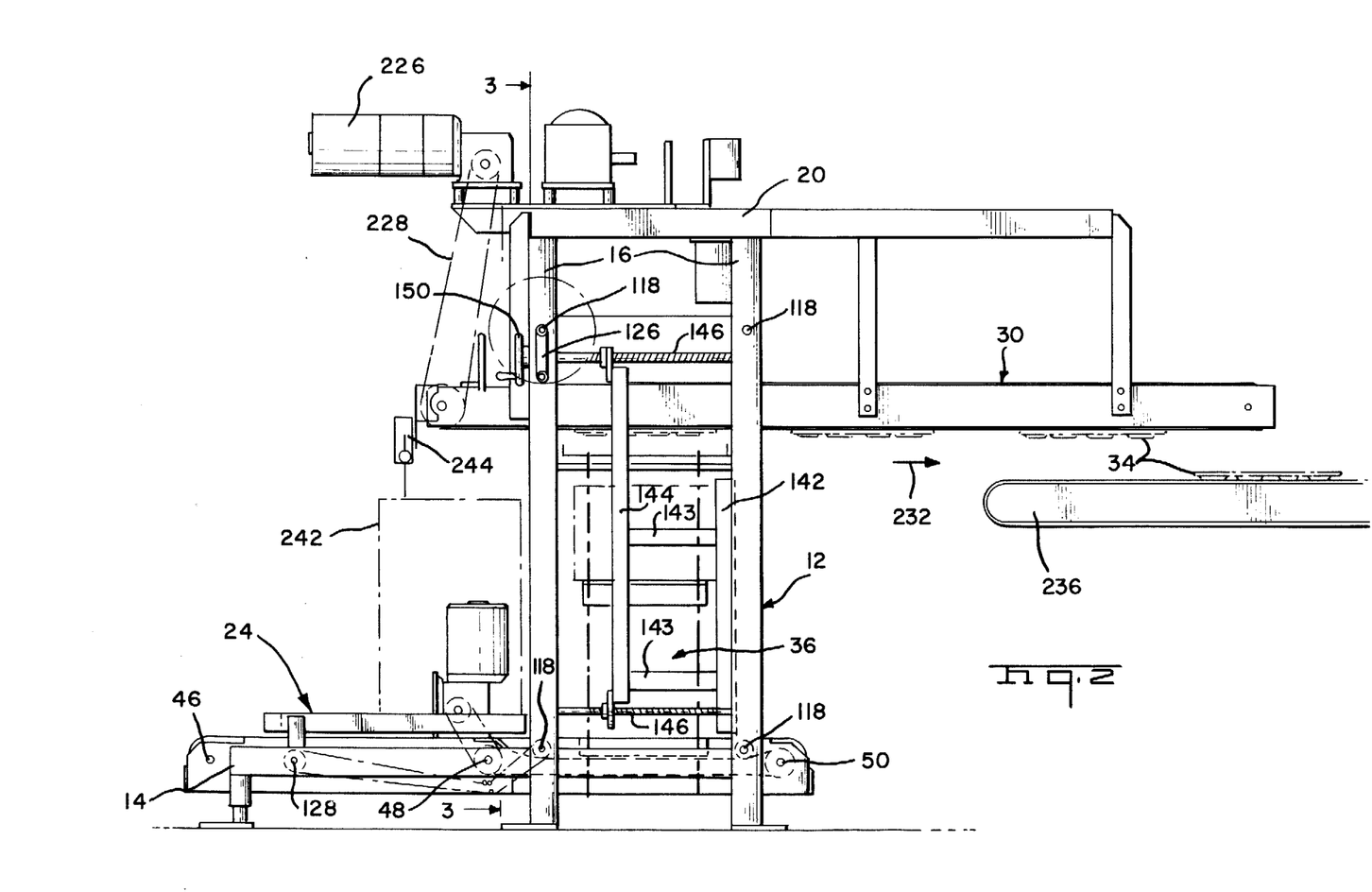
FIG. 2 is a side elevational view of the unstacker.

The frames 54 may be moved toward or away from the infeed and discharge conveyors by rotation of four adjustment shafts 118 which extend across the width of the unstacker between opposed posts 16 and 18. The shafts are journaled in bearings carried by the posts and, as illustrated in FIG. 3, are threaded in an opposite sense to either side of the center of the unstacker. Fixed threaded bushings 120 on plates 56 engage the threads of the shafts. A chain drive 122 extends between sprockets 124 carried on shafts 118 so that rotation of one of the adjustment shafts by handle 126 secured to a shaft at post 16 rotates all of the shafts. Adjustment shaft 128 is journaled in bearings carried by the base 14 and extends through the three infeed conveyors. A tray guide 130 as shown in FIG. 2 is located on either side of the infeed conveyors immediately above the top run of the conveyors and extends from the guide plate 140 to a beveled lead-in surface 132 at the free end of the guide above shaft 46. A support 134 on each guide extends downwardly toward shaft 128 and carries a threaded bushing engageable with the threads on the shaft. Shaft 128 carries a sprocket 136 and is rotatably connected to the adjacent shaft 118 by chain 138. Guide plates 140 connect the guides 130 to front plates 56 of frames 54.

Rotation of handle 126 moves the frames 54 and tray guides 130 and plates 140 toward and away from the center of the conveyor to accommodate stacks of pans of different widths. During lateral adjustment of the frames, the elevator drive sprocket gears 116 roll along the upper runs of chains 100 and 106 an equal distance so that the opposed lift flights 74 on the frames 54 are each moved an equal distance forward or back along their respective paths and are maintained in their relative opposed positions. This assures that during operation of the unstacker the lift flights 74 are opposite to each ohter as they move upwardly along the inner run of chains 70 to lift stacks of pans toward pick up positions 38.

Lateral adjustments of the frames 54 moves the tray guides 130 and upwardly extending guide plates 140 toward or away from the infeed and discharge conveyors so that when they are properly positioned, stacks of pans moved along the infeed conveyor towards the lift position are located between the frames for engagement by the lift flights 74.

The infeed conveyor moves stacks of pans into the unstacker until the pans engage stop posts 142 of adjustable stop assembly 32 shown in FIG. 14. The stop posts 142 are carried by U-shaped rails 143 secured to vertical supports 144 located between the pairs of posts 16 and 18 on either side of the unstacker. Threaded adjustment shafts 146 are journaled in bearings carried by the adjacent posts 16 and 18 and extend through threaded bushings carried on the ends of supports 144. The shafts carry sprocket gears which are linked together by chains 148 so that rotation of handle 150 rotates all of the shafts 146 and moves the stop posts 142 toward or away from the lift position 36. The stop posts are adjusted for different length trays so that the stacks of trays in a lift position are lifted by the lift flights 74 without tilting and are in proper position for engagement by the magnetic pan lift assembly 28.

Figure 4:
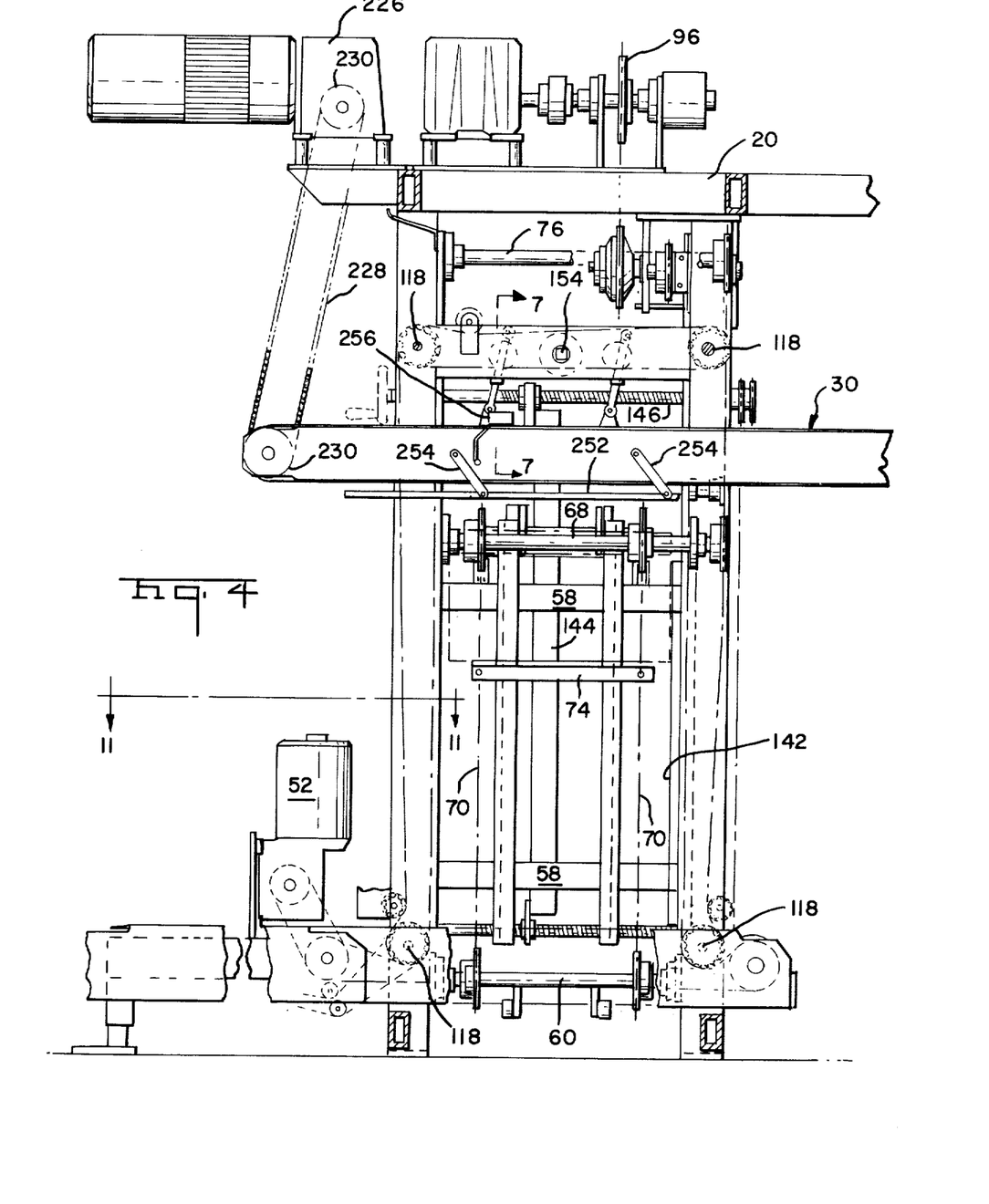
FIG. 4 is a sectional view taken along line 4—4 of FIG. 3.
Figure 5:
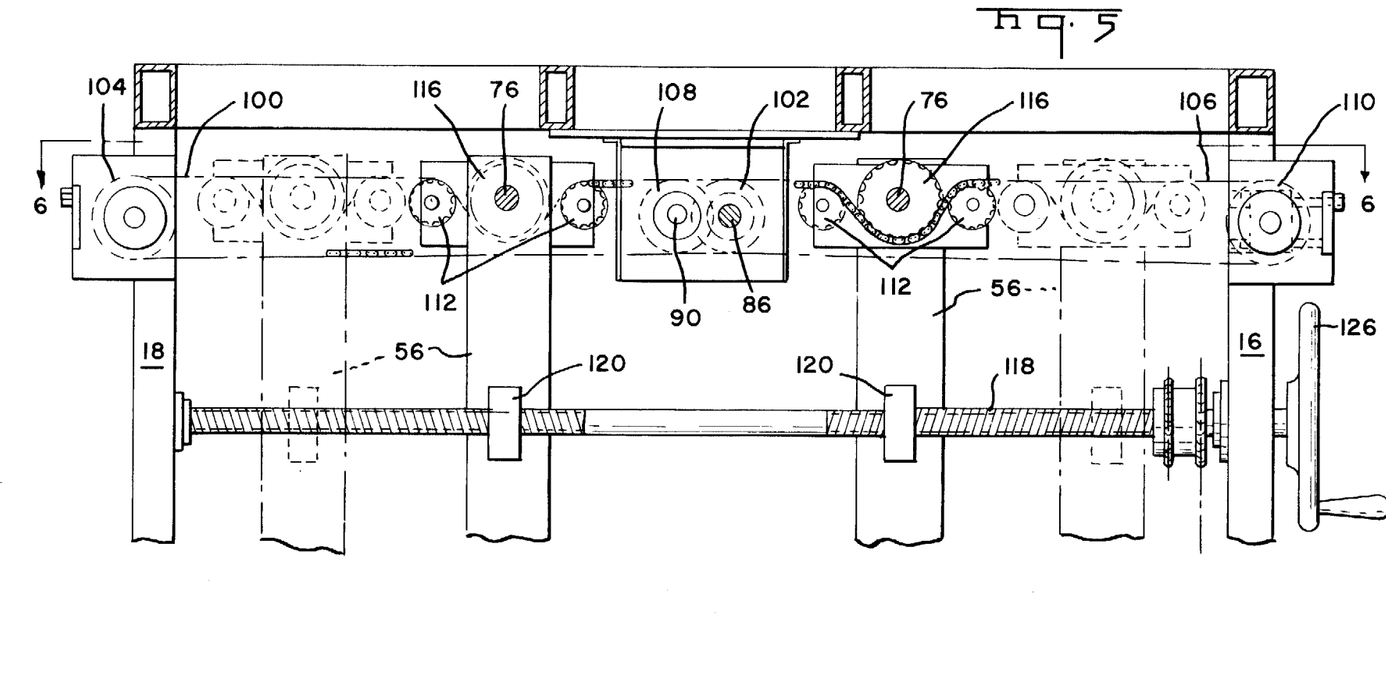
FIG. 5 is an enlarged view of a portion of the unstacker shown at the top of FIG. 4.
Figures 9, 10:
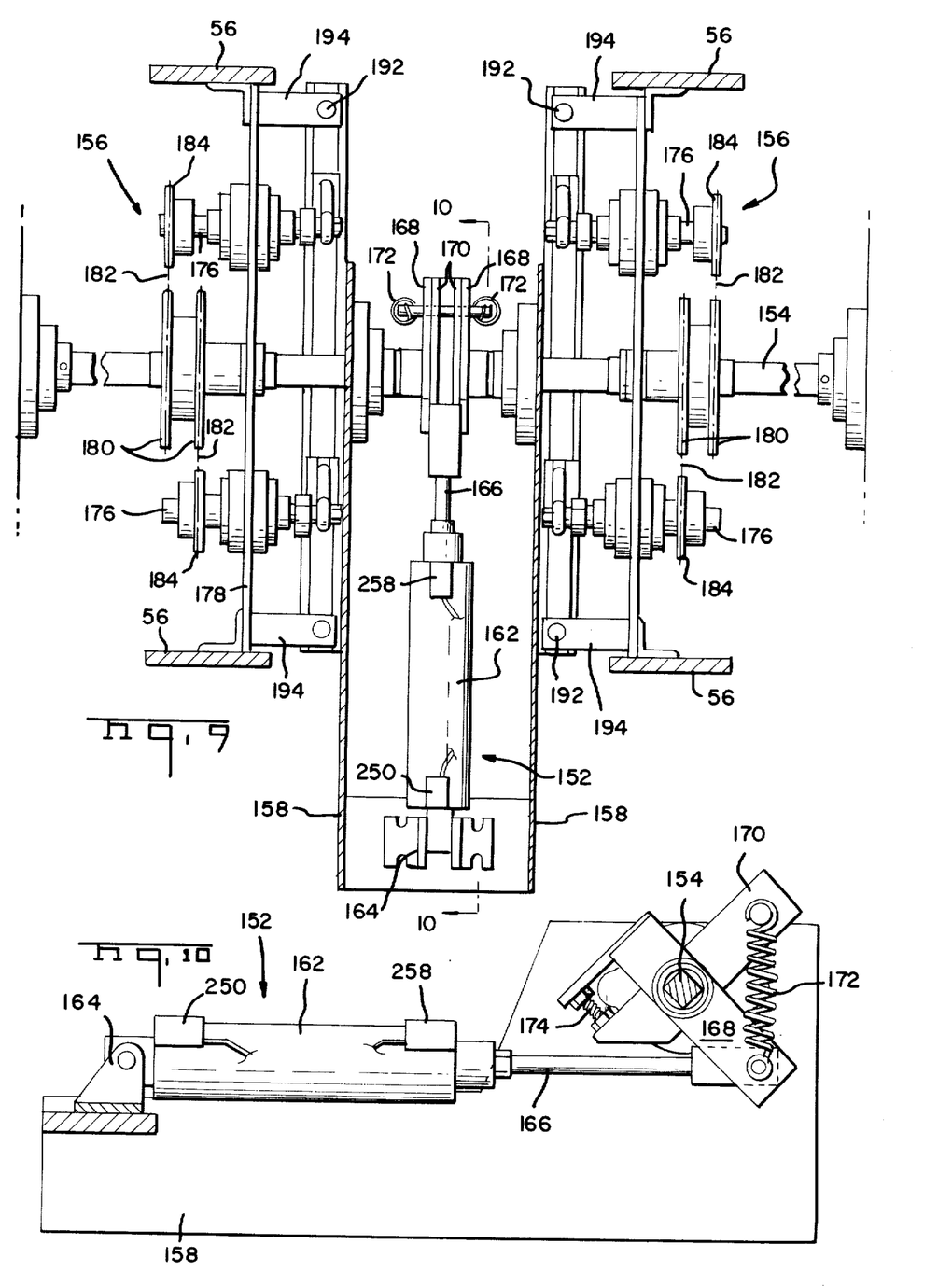
FIG. 10 is a view taken along line 10—10 of FIG. 9.

The lift assembly 28 includes a pneumatic drive unit 152 which oscillates a square drive shaft 154 back and forth, and a pair of magnetic lift units 156 carried by frames 54 and moved in response to rotation of the shaft. As illustrated in FIGS. 4 and 9, shaft 154 is located above the discharge conveyor 30 and is journaled in bearings carried by plates 158 extending down from top 20 and plates 160 extending between adjacent pairs of posts 16 and 18.

The pneumatic unit 152 includes an air cylinder 162 having a pivotally fixed end 164 and a piston rod 166 connected to a pair of crank arms 168 rotatably mounted on shaft 154. Free cranks 168 are connected to fixed cranks 170 which rotate with the square shaft by springs 172 extending between pins carried by the cranks. An adjustable stop 174 carried by fixed cranks 170 prevents springs 172 from rotating the fixed cranks and rod 154 toward the free cranks 168. Stop 174 may be adjusted to vary the vertical position of the pan lift assembly 28.

Each magnetic lift unit 156 includes a pair of shafts 176 journaled in bearings on plate 178 extending between support plates 56. A pair of sprocket gears 180 are rotatably mounted on plate 178. The gears are attached to a square bushing slidably mounted on square shaft 154 to permit movement of the unit along the shaft. Chains 182 connect sprockets 180 with sprockets 184 on shafts 176. Cranks 186 on the ends of the shafts 176 are connected to magnetic lift heads 188 by arms 190 so that oscillation of the square drive shaft 154 raises and lowers the lift heads. The heads carry guide rods 192 which extend through vertical bores in supports 194 to assure that the head moves vertically in response to rotation of shaft 154.

Figure 8:
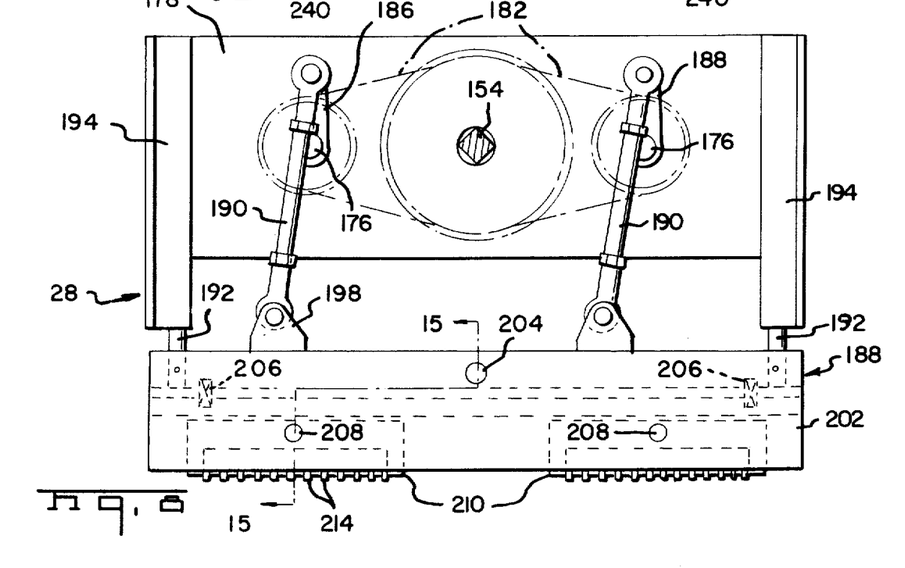
FIGS. 8 and 9 are views taken along lines 8—8 and 9—9 of FIG. 7, respectively.

Magnetic lift head 188 is illustrated in detail in FIGS. 8, 15, and 16 and includes a transversely extending support bar 196 having a pair of brackets 198 on the top of the bar. Rods 192 are secured to the support bar. Bar 198 is fitted in slot 200 on the upper face of H-shaped support 202 and is pivotally secured thereto by cross pin 204. Springs 206 are mounted in bores in the bottom of the slot and in the lower surface of the bar to resist pivoting of the support with respect to the bar.

Cross pins 208 pivotally secure a pair of lift magnets 210 in the lower slot 212 of support 202 and permit limited pivoting of the magnets with respect to the support. Each magnet 210 includes a U-shaped non ferrous body 212 and a number of flat magnetic pole pieces 214 and a number of shock-resistant magnets 216 which are alternately stacked between the legs of the body 212. A bolt 218 extends through the legs of the body 212 and holes formed through the pole pieces and magnets to confine the magnets and pole pieces to the lift magnets 210. The magnets 216 are formed of magnetized barium ferrite particles in a plastic binder and provide a high density shallow magnetic field 220 extending between the ends of the pole pieces projecting outwardly of the lift magnet toward the bottom of the unstacker. In operation, the lift magnets are subjected to sudden shocks and stresses when they are brought down into engagement with the lips or rims of pans to be unstacked. These shocks and stresses are sufficiently large that there is a possibility that conventional high strength magnets would be broken or cracked. Use of the barium ferrite magnets with a resilient binder avoids this possibility while providing the required high density shallow field for picking up only the top tray from a stack of trays.

Figure 7:
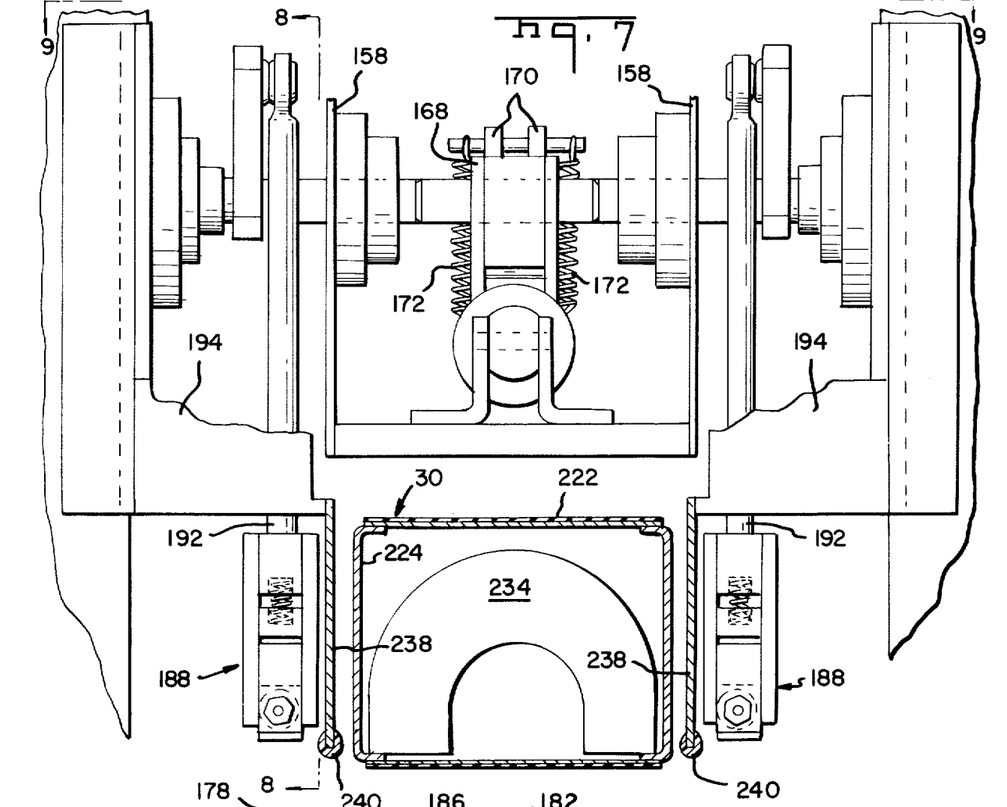
FIG. 7 is a sectional view taken along line 7—7 of FIG. 4.

The magnetic pan lift assembly 28 operates to oscillate the lift heads through a work stroke such that the lift units 210 are moved from a position above the bottom run of the discharge conveyor 30 as illustrated in FIG. 7 down to the pan pick up position 38 where the magnets engage the lateral rims of the top pan 34 and back to the position of FIG. 7 to strip the lifted top pan off against the magnetic discharge conveyor. In FIGS. 7, 8, 9, and 10, the assembly is shown in the up position with the cylinder 162 fully extended. Retraction of the cylinder rotates the free cranks 168 in a counter-clockwise direction as viewed in FIG. 10 so that springs 172 pull fixed cranks 170 with cranks 168 and rotate the shaft 154 in the same direction. Clockwise rotation of shaft 154 in response to retraction of the air cylinder rotates shafts 176 through 180° in a clockwise direction as viewed in FIG. 8 so that the vertical cranks 186 are lowered and the magnetic lift heads 188 are moved down to bring the pole pieces of lift magnets 210 against the lips of the top tray in the pick up position 38.

Following lowering of the lift heads, the air cylinder 162 is extended to rotate the free cranks 168 in a counter-clockwise direction as illustrated in FIG. 10 to engage stop 174 and rotate the fixed cranks 170 and shaft 154 in a counter-clockwise direction. Rotation of the shaft brings the cranks 186 back to the original position as shown in FIG. 8 thus raising the lift heads 188 and the tray carried by the lift heads from the stack of trays and stripping the tray against the lower surface of the discharge conveyor. The lift heads 188 are lowered springs 172 to assure that they are not forced down against the trays. This prevents injury in the case of jams or mispositioned trays.

Discharge conveyor 30 is located above the center flat link conveyor 42 and extends over the pick up and lift positions and rearwardly a distance from the frame. The conveyor includes a belt 222 extending along opposite sides of a conveyor support 224 and around rollers at the ends of the support. A drive motor 226 located on frame top 20 is connected to the conveyor roller at the front end of the conveyor by chain 228 and sprockets 230 to drive the belt 222 in a direction so that the lower run moves in the direction of arrow 232 as illustrated in FIG. 2. A series of magnets 234 are mounted in support 224 with their poles adjacent the lower run of belt 222 to hold the trays against the lower run as the trays are moved outwardly of the unstacker. A conventional tray-receiving conveyor 236 may be located beneath the downstream end of discharge conveyor 30 to receive the individual trays from the unstacker. The trays may be delivered to any type of a tray-receiving device as desired by the user.

Pan stripper plates 238 are carried by supports 194 and extend downwardly toward the lower run of the discharge conveyor 30. A resilient protective cap 240 is provided on the lower edges of the plates 238. The cap is located slightly above the lower run of the discharge conveyor.

The operation of the unstacker will now be described in detail.

The unstacker 10 is manually adjusted by means of cranks 126 and 150 so that the guide elevator and lift assembly 26 and stop assembly 32 are both properly positioned to accommodate the size of pans to be unstacked. Crank 126 is rotated to move the guides, elevators, and lift heads laterally in or out with respect to the central infeed conveyor belt 42 so that lift flights 74 will engage the bottom tray to lift the stack and the exposed pole pieces 214 of the lift heads will engage the side lips of the trays in the stack. When properly positioned to accommodate the trays to be unstacked, the tray guides 130 and guide plates 140 are spaced so that the stack of trays is properly positioned on the infeed conveyor and straightened as it is moved toward the lift position. The position of the stop posts 142 is adjusted by turning crank 150 so that when the stack is moved against the stop posts, the flights and lift heads are equidistant from adjacent tray corners thereby preventing tilting of the stack as it is lifted by the flights or tilting of the individual trays as they are unstacked by the lift heads. During lateral adjustment of the guides, elevator, and lift assemblies, the frames 54 are moved along support angles 64, the drive sprockets 180 for the lift units slide in square bushings along the square rock shaft 154 and the elevator drive sprockets 116 move along the upper runs of chains 100 and 106.

Operation of unstacker 10 is begun by turning on the infeed and discharge conveyors. The discharge conveyor is continuously operated. A stack 242 of individual pans 34 is placed on the three conveyor belts of the infeed conveyor. Guides 130 center the stack on the conveyor. As the stack is moved toward the lift position 36, it passes beneath the wand of switch 244 shown in FIG. 2. The wand is positioned at the maximum height of a stack which can be handled by the unstacker 10. If the stack exceeds this height the stack hits the wand and the switch is tripped to stop the infeed conveyor and also sound an alarm.

Further movement of the stack toward the lift position brings it past the vertical guide plates 140 extending upwardly to the top of the stack. Occasionally, the stack will lean to one side or the other because of bakery products left on the trays, warped trays, or other causes. The guide plates 140 straighten tilted stacks and assure that the stack is properly aligned for movement by infeed conveyor 42 between the frames 54 located close to the sides of the stack. As a stack is moved to the lift position, it engages wand of switch 246 located on a cross member of the base between conveyors 40 and 42 to close the switch for an interval. Closing the switch does not effect the operation of the unstacker at this time.

When the aligned stack of pans is moved into the lift position, it engages stop posts 142 and closes proximity switch 248 mounted on lower rail 143. When the stack engages the stop posts 142 it is located in the lift position between the closely spaced elevators on frames 154 with the lift flights located equidistant from the front and back of the stack.

Closing of switch 248 shuts off the infeed conveyor and turns on elevator drive motor 84 to move a pair of lift flights 74 beneath the edges of the stack so that the stack is lifted from the infeed conveyor and raised toward the discharge conveyor. The stack is moved upwardly until the upper most tray 34 breaks the beam of light extending between photo-control light source 250 and receiver 252. The upper most tray of the stack is now in the pick up position 38.

Blocking of the photo-control actuates a switch to shift a solenoid controlled valve and retract air cylinder 162 so that the magnetic lift units 210 are lowered through springs 172 from the retracted position of FIG. 7 to engage the beads to either side of the tray in the pick up position. The pole pieces of the lift magnets 210 normally engage the beads of the upper most tray before the cylinder 162 is fully retracted so that springs 172 are stressed during the final portion of the pick up stroke. The over travel of the lift assembly assures engagement between the magnet and trays which are presented for pick up with misaligned beads. This could occur, for example, when a tray in the stack is bent or warped or carries a bakery product.

Flush engagement of each of the lift magnets 210 with the adjacent tray beads is facilitated by pivoting of the magnets with respect to support 202 and pivoting of the entire support with respect to bar 196. This pivotal movement of the lift magnets enables the exposed pole pieces to be positioned flush on or sufficiently close to the bead of the tray to be lifted so that the strong shallow magnetic field of the magnets in the lift heads holds the tray to the lift head sufficiently strongly so that upon retraction of the lift heads the tray is lifted from the stack and carried up to the discharge conveyor. As illustrated in FIG. 16, the shallow field 220 is not sufficiently strong to lift the second tray in the stack.

When air cylinder 162 is fully retracted, the piston actuates a magnetic switch 250 which shifts the solenoid control valve to extend the cylinder thereby lifting the heads 188 back to the retracted position of FIG. 7. As the top tray if moved upwardly with the heads, it is brought against the lower run of discharge conveyor belt 222 before the lift heads are fully retracted so that with further retraction the magnets in the lift heads are stripped away from the pan. Magnets 234 in the discharge conveyor hold the pan against the lower run of the conveyor so that movement of the lower run conveys the pan outwardly of the unstacker for subsequent discharge onto tray-receiving conveyor 236 or any other tray receiving unit desired by the operator. The stripper plates 238 are located adjacent the lift heads 188 slightly above the lower run of the discharge conveyor. The plates assure that the pans are properly stripped from the lift heads. This is important when the magnetic force between two heads 188 and the pans is unequal so that when the pan is brought against the discharge conveyor one head only might be broken away leaving the pan hanging from the other head. The protective beads 240 on the lower edges of the stripper plates prevent injury to the pans.

As the pan is lifted up to the discharge conveyor it engages and lifts sensor bar 252 which is pivotally mounted on the discharge conveyor by links 254. Upward movement of the bar brings a link into engagement with the trigger of switch 256 to actuate the switch and thereby prevent the cylinder 162 from retracting to lower the heads until the pan on the discharge conveyor has been moved past bar 252 allowing the bar to fall and switch 256 to be deactuated. In this way, the pan is moved out of the way of descent of the lift heads on their next cycle.

The lift magnets, stripper plates, discharge conveyor and bar 252 all engage the pan beads and do not touch the central product support surfaces of pans 34.

When the switch 256 is deactuated and the cylinder 162 is fully extended, the piston in the cylinder triggers magnetic switch 258 to reverse the solenoid control valve and retract the cylinder, thereby initiating another lift cycle.

As pans are moved from the stack by the lift assembly, the level of the stack is lowered below the photo-control light source and receiver, thereby actuating elevator drive motor 84 to elevate the stack until the beam is again broken. This way, the pans in the stack are brought up to the pick up position for individual movement to the discharge conveyor by the fixed-stroke lift unit.

When the lift flights raise the stack of pans 242 above the lift position, switch 248 is deactivated thereby starting the infeed conveyors which move the next stack of pans previously positioned on conveyors toward the lift position until the stack engages the trigger of switch 246 to stop the conveyor. Another stack of pans may be positioned on the conveyor behind the stack adjacent the lift position.

The lift unit continues to unstack individual pans from the top of the elevated stack until the lowest pan is above the height of the stacks on the infeed conveyors and one of the lift flights 74 is raised sufficiently to engage the trigger of switch 258 carried by a rung 58. Actuation of the switch stops the movement of the lift flights and starts the infeed conveyor to move the next stack of pans to the lift position. When the pans engage stop posts 142 switch 248 is again actuated stopping the infeed conveyor and reactivating the elevator when the light beam is re-established. During this operation pans on the elevated stack are unstacked until the final pan is picked up and stripped off onto the discharge conveyor. Removal of the final pans opens the light beam between the light source and receiver to energize the elevator so that the pair of lift flights 74 which supported the stack of pans are rotated out of the area and the pair of flights 74 adjacent the frame base 14 are moved under the stack of pans in the lift position and lift the stack until the top pan is in the pick up position and breaks the beam of light between the source 250 and 252. The next stack of pans on the infeed conveyor is moved to the lift position while the remaining pans of the lifted stack are being unstacked so that the next stack is rapidly moved up to the pick up position. In this way, the interval between pans during the change over from one stack to another stack is minimized.

In operation, the unstacker 10 is capable of unstacking pans on a production basis at a rate of up to 40 to 45 pans per minute. The pans are delivered regularly at known intervals from the discharge conveyor 236. Because the unstacker engages the pan rims or beads, the protective glaze on the product-supporting surface of the pans is not damaged. The lift air cylinder 162 rotates the cranks 186 from between vertical positions so that the lift heads are smoothly accelerated and decelerated between the raised and lowered positions to cushion the impact between the heads and the pans during pick up and the engagement between the pans and the discharge conveyor during stripping from the heads on the upstroke. Because the stack is raised to the pick up position, the pick up position is located immediately adjacent the discharge conveyor and the lift heads are moved through a minimum stroke, with the resultant decrease in the cycle time of the unstacker and reduction in the amount of energy required to move the lift heads through their cycle of operation as compared to conventional unstackers where trays or pans are unstacked from a fixed stack and the delivery stroke increases as the height of the stack is diminished.

The unstacker is intended for use in unstacking bakery product pans which may weight from 10 to 15 pounds each. With the barium ferrite magnets and alternate pole pieces a high density shallow depth magnetic field is provided sufficient to secure the top pan of the stacked pans firmly against the lift heads without lifting the second pan in the stack. The strength of the magnets assures that the top pan is lifted despite imperfect seating of the magnets on pan beads or rims distorted due to bent pans or foreign matter between the pans in the stack. While the unstacker 10 has been described for use in removing bakery product pans from a stack of pans, it is obvious that the unstacker may be used to unstack pans for other purposes or even sheets of magnetic material without lips.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A pan unstacker comprising a support frame; means on the support frame for locating a stack of pans at a lift position; a magnetic discharge conveyor on the support frame having a lower run passing over the lift position and extending outwardly of the support frame; a pair of moveable frames located to either side of the lift position; an elevator on each moveable frame cooperable for lifting a stack of pans from the lift position and moving such stack toward the discharge conveyor to locate the top pan in a pick up position a distance below the discharge conveyor; a lift assembly on each moveable frame including a lift magnet, each assembly being moveable from a retracted position above the lower run of the discharge conveyor toward the elevated stack for magnetic engagement with the top pan in the pick up position and back to the retracted position so that the pan is lifted from the stack and stripped onto the discharge conveyor to be carried away from the unstacker; adjustment means for moving the movable frames and elevators and lift assemblies thereon toward or away from the lift position to accommodate pans of different widths; drive means for the elevators and lift assemblies on the support frame; and drive connections between the drive means and the elevators and lift assemblies permitting movement of the elevators and lift assemblies with respect to the drive means by said adjustment means.

2. A pan unstacker as in claim 1, including a stripper plate on each adjustable frame, the plate having a knock-off edge located above the lower run of the discharge conveyor and below the magnet when the assembly is retracted.

3. A pan unstacker as in claim 1, including an infeed conveyor on the support frame including a run extending to the lift position.

4. A pan unstacker as in claim 3, wherein the infeed conveyor includes an upper rim movable in the same direction as the lower run of the discharge conveyor and wherein the drive connection for the lift assemblies includes a rotatable shaft of uniform cross section along its length and have a non-circular feature rotatably mounted on the support frame above the discharge conveyor and extending to either side of the discharge conveyor above the pick up position, a rotatable bushing on each moveable frame surrounding the shaft for free movement along the axis of the shaft and engaging said feature on the shaft for rotational movement with the shaft, an operative connection between each bushing and the lift assembly on the moveable frame and an operable connection between the shaft and drive means for the lift assembly on the support frame whereby rotation of the shaft by such drive means moves the lift assemblies.

5. A pan unstacker as in claim 4, including a crank on each moveable frame operatively connected to the bushing on the moveable frame for movement with the bushing, and a rod extending from the crank to the lift assembly, the crank extending away from the pick up position when the assembly is retracted and toward the pick up position when the lift assembly is lowered for engagement with the top pan.

6. A pan unstacker as in claim 5, including a spring in the operable connection rotating the shaft to lower the lift assemblies and a rigid connection in the operable connection rotating the shaft to raise the lift assemblies.

7. A pan unstacker as in claim 6, wherein said shaft has a polygonal cross section and the bushings have polygonal openings fitted on the shaft.

8. A pan unstacker as in claim 1, wherein each elevator includes a sprocket gear rotatably mounted on the moveable frame below the lift position; a second sprocket gear rotatably mounted on the moveable frame above the pick up position; a chain extending around said gears; at least one lift member on the chain; the drive connection for the lift assemblies including gears mounted on the support frame to either side of and above the discharge conveyor; a length of chain extending from each such gear on the support frame to the discharge conveyor; a chain drive member on the support frame for moving said lengths of chain; a drive sprocket gear rotatably mounted on each moveable frame engaging one of said lengths of chain; and an operative connection between each drive sprocket gear and the chain on the moveable frame whereby actuation of the chain drive member moves the lengths of chain on each side of the discharge conveyor to rotate the drive sprocket gears and thereby move the lift members along runs from below the lift position to the pick up position.

9. A pan unstacker as in claim 8, wherein the chain drive member is mounted on the support frame above the discharge conveyor and including a second pair of sprocket gears mounted on the support frame above the discharge conveyor; drive chains extending between second sprocket gears and the sprocket gear on the support frame to either side of the discharge conveyor; a drive connection between the chain drive member and second sprocket gears whereby actuation of the chain drive moves the drive chains around the gears.

10. A pan unstacker as in claim 9, wherein said chain drive member comprises an electric motor and including a drive shaft on the support frame rotated by the motor, a second drive shaft; gears on said drive shafts meshed so that the drive shafts rotate in opposite directions and where each drive shaft carries one of said second sprocket gears so that the like runs of said drive chains move in the opposite directions and wherein said drive sprocket gears on the moveable frames engage like runs of said drive chains.

11. A pan unstacker as in claim 10, wherein said motor rotates said shafts to move the like runs toward the second sprocket gears.

12. A pan unstacker as in claim 1, wherein said adjustment means comprises at least one shaft rotatably mounted on the support frame and extending to either side of the lift position; reverse threads on the shaft to either side of the lift position; fixed threaded bushings on the moveable frames engageable with said threads; support wheels on the moveable frames engageable with the support frame to permit lateral movement of the moveable frames and whereby rotation of said shaft shifts the moveable frames toward and away from the lift position to accommodate different width pans and the support wheels roll along the support frame.

13. A pan unstacker as in claim 1, wherein the magnet of each lift assembly includes a series of magnetic pole pieces, a number of plastic berium ferrite magnets located between the pole pieces, ends of the pole pieces extending from the lift assembly toward the pick up position for engagement with the lip of a pan in the pick up position.

14. A pan unstacker as in claim 13, including a connection between the magnet and lift assembly permitting the magnet to rotate about an axis perpendicular to the pan rim for engagement with distorted rims.

15. A pan unstacker as in claim 14, wherein each lift assembly includes two such magnets both pivotally mounted on the lift assembly.

16. A pan unstacker as in claim 15, wherein each lift assembly includes a lift head having a support pivotally mounted on said head and a pair of magnets pivotally mounted on said support to eight side of the pivot connection between the support and the head.

17. A pan unstacker as in claim 1, including a stop on the support frame in the path of movement of a stack of pans to the lift position and adjustment means for moving the stop toward and away from the lift position to accommodate pans of different lengths.

18. A pan unstacker as in claim 17, including an infeed conveyor on the support frame having an upper run extending to the lift position and adjustment means for moving the stop toward and away from the lift position to accommodate pans of different lengths.

19. An unstacker comprising a main support frame; means for supporting a stack of articles at a lift position in the frame; a discharge conveyor located on the support frame having a lower run passing over the lift position and extending outwardly of the support frame; a pair of moveable frames located to either side of the discharge conveyor at an article pick up position; elevator means supported by the main frame for lifting the stack of articles at the lift position toward the discharge conveyor to position the top article in the stack at the pick up position below the discharge conveyor; an article lift assembly lift assembly on each moveable frame normally positioned above the lower run of the discharge conveyor and extendable downwardly to the pick up position to engage the top article of the stack of articles and retractable above the discharge conveyor to strip the top article onto the conveyor for movement by the conveyor outwardly of the unstacker; drive means for the lift assemblies on the support frame; means for laterally adjusting the moveable frames with respect to the discharge conveyor to locate the lift assemblies thereon for engagement with selective portions of the top article of the stack of articles; and a drive connection between the drive means and the lift assemblies operable to raise and lower the lift assemblies while permitting lateral movement of the moveable frames.

20. An unstacker as in claim 19 wherein the drive connection includes a shaft rotatably mounted on the support frame above the discharge conveyor and extending to either side of the discharge conveyor, said drive means operable to rotate said shaft, and a member rotatably mounted on each moveable frame and engagable with the shaft for free longitudinal movement along the shaft and rotational movement with the shaft, each member being connected to its respective lift assembly so that rotation of the shaft by the drive means raises and lowers the lift assemblies while permitting lateral movement of the frames with respect to the discharge conveyor.

21. An unstacker as in claim 19, wherein said elevator means includes an elevator on each moveable frame including a lift member moveable from below the lift position toward the pick up position, such members cooperable to engage the bottom of the stack of articles and raise the same toward the pick up position; drive means for the elevators on the support frame and an elevator drive connection between such drive means and the elevators permitting lateral adjustment of the moveable frame.

22. An unstacker as in claim 21, wherein each lift assembly includes a magnetic lift head having a magnet at the lower surface thereof with exposed pole pieces facing the pick up position for engagement with the top article.

23. An unstacker as in claim 22, wherein each magnet includes a number of spaced pole pieces with individual magnets formed of magnitized particles in a plastic binder sandwiched between the pole pieces.

24. An unstacker as in claim 23, wherein each lift magnet is moveably mounted in its respective lift head to facilitate engagement with articles in the stack.

* * * * *